(12) United States Patent
Kim (10) Patent No.: US 11,394,981 B2
(45) Date of Patent: Jul. 19, 2022

(54) ELECTRONIC APPARATUS AND CONTROL METHOD THEREOF

(71) Applicant: Samsung Electronics Co., Ltd., Suwon-si (KR)

(72) Inventor: Jongho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/110,505

(22) Filed: Dec. 3, 2020

(65) Prior Publication Data

US 2021/0176477 A1  Jun. 10, 2021

(30) Foreign Application Priority Data

Dec. 9, 2019 (KR) .................. 10-2019-0162566

(51) Int. Cl.
*H04N 19/184* (2014.01)
*H04N 19/176* (2014.01)
*H04N 19/124* (2014.01)

(52) U.S. Cl.
CPC ......... *H04N 19/184* (2014.11); *H04N 19/124* (2014.11); *H04N 19/176* (2014.11)

(58) Field of Classification Search
CPC .. H04N 19/184; H04N 19/176; H04N 19/124; H04N 19/126; H04N 19/115; H04N 19/14; H04N 19/18
See application file for complete search history.

(56) References Cited

U.S. PATENT DOCUMENTS

| 6,574,368 | B1* | 6/2003 | Boon ................. H04N 19/172 382/232 |
| 10,230,950 | B2 | 3/2019 | Peng et al. |
| 2005/0084007 | A1* | 4/2005 | Lightstone ........... H04N 19/61 375/240.03 |
| 2008/0165861 | A1 | 7/2008 | Wen et al. |
| 2008/0225944 | A1 | 9/2008 | Pore et al. |
| 2012/0224629 | A1 | 9/2012 | Bhagavathy et al. |
| 2014/0355671 | A1 | 12/2014 | Peng et al. |
| 2014/0369621 | A1* | 12/2014 | Diggins ................ H04N 19/14 382/251 |
| 2015/0312575 | A1 | 10/2015 | Bryant |

FOREIGN PATENT DOCUMENTS

WO    2014/008541    1/2014

OTHER PUBLICATIONS

International Search Report and Written Opinion of the International Searching Authority dated Mar. 15, 2021 in International Patent Application No. PCT/KR2020/017399.

* cited by examiner

*Primary Examiner* — Nam D Pham
(74) *Attorney, Agent, or Firm* — Staas & Halsey LLP (57) ABSTRACT

An electronic apparatus includes: an interface configured to communicate with an external apparatus; and a processor configured to encode data of image content with a bit number based on complexity of an image in an area according to areas of frames of the image content, and control the interface to transmit the encoded data to the external apparatus.

16 Claims, 6 Drawing Sheets

ELECTRONIC APPARATUS AND CONTROL METHOD THEREOF

CROSS-REFERENCE TO RELATED THE APPLICATION

This application is based on and claims priority under 35 U.S.C. § 119 to Korean Patent Application No. 10-2019-0162566 filed on Dec. 9, 2019 in the Korean Intellectual Property Office, the disclosure of which is incorporated by reference herein in its entirety.

BACKGROUND

Field

The disclosure relates to an electronic apparatus capable of encoding image content data based on a predetermined image format and a control method thereof, and more particularly to an electronic apparatus, which can perform encoding while guaranteeing image quality of an image even though image content data is compressed to meet a target bit rate, and a control method thereof.

Description of the Related Art

To compute and process predetermined information in accordance with certain processes, an electronic apparatus basically includes a central processing unit (CPU), a chipset, a memory, and the like electronic parts for the computation. Such an electronic apparatus may be variously classified in accordance with what information will be processed and what it is used for. For example, the electronic apparatus is classified into an information processing apparatus such as a personal computer (PC), a server or the like for processing general information; an image processing apparatus for processing image content data; an audio apparatus for processing an audio signal; home appliances for miscellaneous household chores; etc. The image processing apparatus includes a source apparatus that encodes the image content data by preset image format and outputs the encoded data, and a sink apparatus that decodes the encoded data output from the source apparatus. When the sink apparatus is embodied as a display apparatus that displays an image based on pr image data on its own display panel, the sink apparatus can display an image based on the decoded data on the display panel.

The source apparatus may control an encoding bit rate with a constant bit rate or a variable bit rate when encoding data. When a real-time image-streaming service or a video on demand (VOD) service is provided, there is usually a limit in a data transfer bandwidth on a network, and therefore the constant bit rate is used to encode data at a constant average bit rate. On the other hand, when data is encoded and recorded in a digital versatile disc (DVD), a Blu-ray or the like optical media, there is a limit of only the storage capacity of the optical media without the above-mentioned limit, and therefore the variable bit rate may be used.

When the constant bit rate is used, for example, the source apparatus sets a target bit rate to guarantee quality of an image if possible, within an allowable range of the transfer bandwidth, and encodes image content data in units of image frames so that a compression rate can meet to the set target bit rate. When the compression rate is set with regard to the whole image content data, image frames are different in data size after compression according to the characteristics of the image, and it is therefore not easy to meet the target bit rate after the compression. When the data size after the compression exceeds a target compression rate, it may be difficult to transfer the data. On the other hand, when the data size after the compression does not reach the target compression rate, the quality of the image quality may be deteriorated.

In this regard, there may be needed a method by which the source apparatus easily encodes image content data at a target bit rate while minimizing deterioration in quality of an image.

SUMMARY

According to an embodiment of the disclosure, there is provided an electronic apparatus including: an interface configured to communicate with an external apparatus; and a processor configured to: encode data of image content with a bit number based on complexity of an image in an area according to areas of frames of the image content, and control the interface to transmit the encoded data to the external apparatus.

The processor may be configured to: encode a first area of the frame with a first bit number, and encode a second area of the frame, which includes a higher complexity than the first area of the frame, with a second bit number greater than the first bit number.

The complexity of the image may be based on a frequency characteristic of the image in the area.

The processor may be configured to: identify a plurality of areas different in the frequency characteristics of the image from each other in the frame, and assign a bit number corresponding to the frequency characteristics of the corresponding area to each individual identified area.

The processor may be configured to identify the plurality of areas different in the frequency characteristics of the image from each other in the frame, based on a block in which a plurality of reference values are distributed according to a frequency component.

The processor may be configured to assign the bit number based on an energy level of the frequency component to each individual identified area.

The processor may be configured to set the bit number based on a model learned about the complexity of the image.

The model may be learned based on a reference image obtained by encoding a learning image with a previously defined bit number.

The processor may be configured to: identify a target bit rate; and set the bit number to be used for the encoding based on the identified target bit rate.

The processor may be configured to draw a quantization parameter being in inverse proportion to the bit number set for the area, and encode the data of the area based on the drawn quantization parameter.

According to another embodiment of the disclosure, there is provided a method of controlling an electronic apparatus, including: obtaining image content; encoding data of the image content with a bit number based on complexity of an image in an area according to areas of frames of the image content; and transmitting the encoded data to the external apparatus.

BRIEF DESCRIPTION OF THE DRAWINGS

The above and/or other aspects will become apparent and more readily appreciated from the following description of embodiments, taken in conjunction with the accompanying drawings, in which.

DETAILED DESCRIPTION OF EMBODIMENTS

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
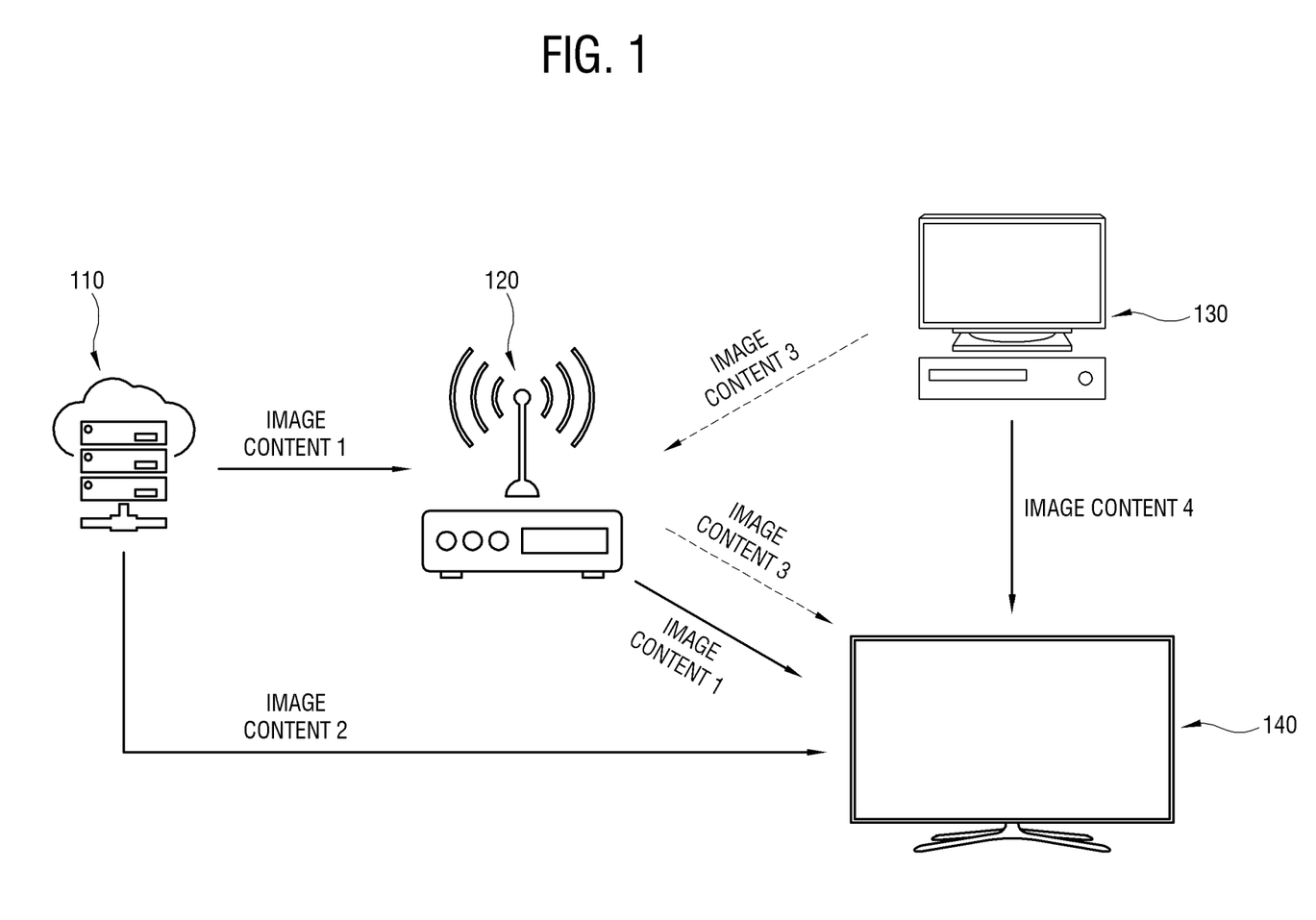
FIG. 1 illustrates that a plurality of electronic apparatuses are connected to communicate with one another.

FIG. 1 illustrates that a plurality of electronic apparatuses are connected to communicate with one another.

As shown in FIG. 1, a plurality of electronic apparatuses 110, 120, 130 and 140 are connected through a wide area network (WAN) or a local area network (LAN) to communicate with one another. Under various kinds of networks, each of the electronic apparatuses 110, 120, 130 and 140 may provide image content data to other electronic apparatuses 110, 120, 130 and 140. In this embodiment, four kinds of electronic apparatuses 110, 120, 130 and 140 such as a server 110, an access point (AP) 120, an image processing apparatus 130, and a display apparatus 140 are given by way of example, but the electronic apparatuses 110, 120, 130 and 140 are not limited to these examples. The electronic apparatuses 110, 120, 130 and 140 may include various kinds of apparatuses capable of processing image content, such as a television (TV), a monitor for a computer, a digital whiteboard, a digital signage, an electronic frame, a set-top box, a video wall, a portable multimedia player, an optical media player, a wearable device, a tablet computer, a mobile device, a host apparatus, etc.

According to roles, such a plurality of electronic apparatuses 110, 120, 130 and 140 may be separated into a source apparatus that provides image content and a sink apparatus that receives the image content. For example, the display apparatus 140 functioning as the sink apparatus receives the image content data from various kinds of source apparatuses by various kinds of transmission modes.

When the display apparatus 140 connects with the server 110 through the AP 120 by Wi-Fi, the sever 110 functioning as the source apparatus may transmit the image content data to the display apparatus 140 through the AP 120 by a streaming mode. Alternatively, the server 110 may transmit the image content data to the display apparatus 140 through long term evolution (LTE) or the like mobile communication.

However, the server 110 on the WAN is not only one that functions as the source apparatus. For example, when the image processing apparatus 130 and the display apparatus 140 are connected to one AP 120, the image processing apparatus 130 functioning as the source apparatus can transmit the image content data to the display apparatus 140 through the AP 120. Further, the image processing apparatus 130 may transmit the image content data to the display apparatus 140 by Bluetooth (BT), Bluetooth low energy (BLE) or the like peer-to-peer wireless communication without the AP 120. Further, when a plurality of display apparatuses 140 are combined to form a video wall, a host apparatus or a main image processing apparatus for the video wall may function as the source apparatus, and the plurality of display apparatuses 140 may function as the sink apparatus.

Such various kinds of electronic apparatuses 110, 120, 130 and 140 may provide and receive the image content by various methods. In this case, the source apparatus among the electronic apparatuses 110, 120, 130 and 140 encodes the image content data at a compression rate corresponding to a preset target bit rate by taking factors such as a limit of an available bandwidth in a wireless communication environment, etc. into account, and transmits the encoded data to the sink apparatus. A method by which the source apparatus encodes data will be described later.

Below, the configurations of the electronic apparatuses 110, 120, 130 and 140 will be described.

Figure 2:
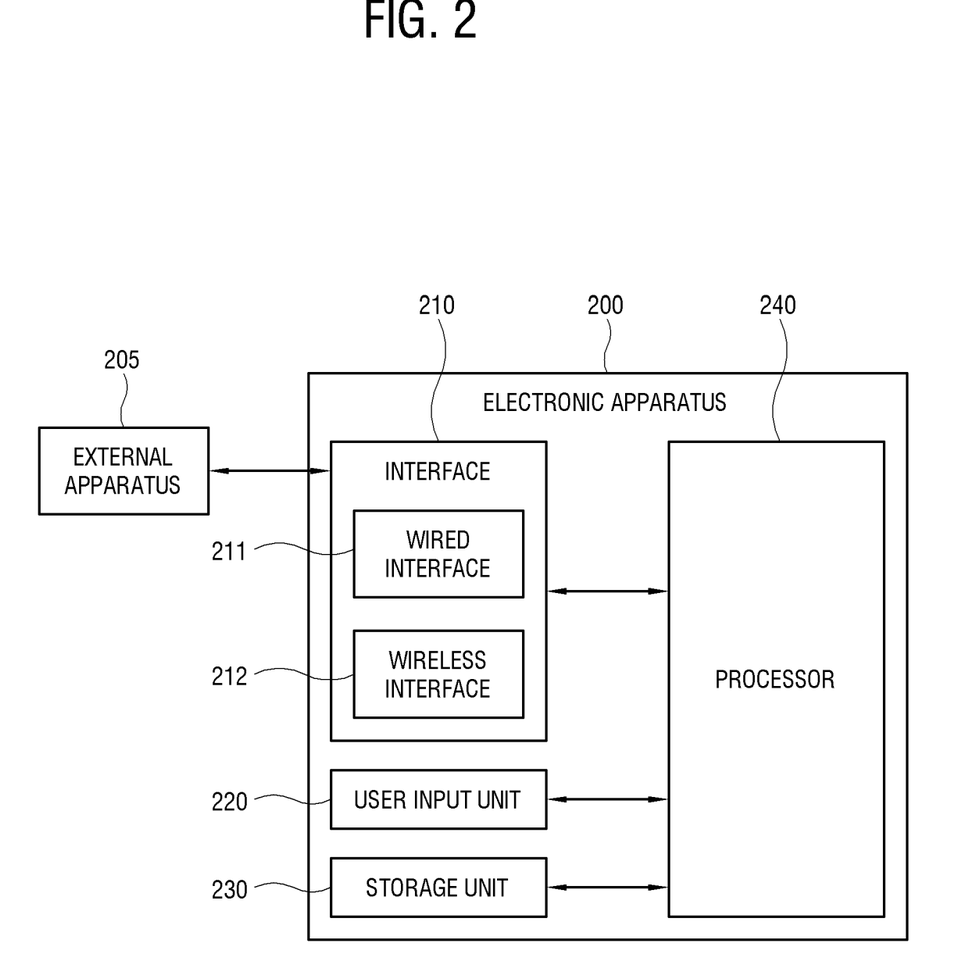
FIG. 2 is a block diagram of the electronic apparatus.

FIG. 2 is a block diagram of the electronic apparatus;

As shown in FIG. 2, an electronic apparatus 200 includes many hardware elements needed for operations. The elements included in the electronic apparatus 200 are not limited to only the following examples, but may include additional elements or exclude some elements as necessary when the electronic apparatus 200 is embodied. For example, the electronic apparatus 200 may additionally include a display panel for displaying an image.

In this embodiment, the electronic apparatus 200 operates as the source apparatus that transmits image content data. An external apparatus 205 operates as the sink apparatus that receives image content data from the electronic apparatus 200. The external apparatus 205 has a basic configuration similar to those of the electronic apparatus 200 in this embodiment or a usual display apparatus except a configuration for an operation of decoding the image content data to be displayed as an image, and therefore repetitive descriptions thereof will be omitted.

The electronic apparatus 200 may include an interface 210. The interface 210 includes an interface circuit through which the electronic apparatus 200 performs communication with various kinds of apparatuses such as the external apparatus 205 and a server and transmits and receives data. According to connection methods, the interface 210 includes one or more wired interface 211 for wired communication connection, and one or more wireless interface 212 for wireless communication connection.

The wired interface 211 includes a connector or port to which a cable of previously defined transmission standards is connected. For example, the wired interface 211 includes a port connecting with a terrestrial or satellite antenna to receive a broadcast signal or connecting with a cable for cable broadcasting. Further, the wired interface 211 include ports to which cables of various wired transmission standards such as high definition multimedia interface (HDMI), DisplayPort (DP), digital video interactive (DVI), component, composite, S-video, thunderbolt, and the like to connect with various image processing apparatuses. Further, the wired interface 211 includes a port of universal serial bus (USB) standards to connect with a USB device. Further, the wired interface 211 includes an optical port to which an optical cable is connected. Further, the wired interface 211 includes an audio input port to which an external microphone is connected, and an audio output port to which a headset, an earphone, a loudspeaker etc. is connected. Further, the wired interface 211 includes an Ethernet port connected to a gateway, a router, a hub, etc. for connection with the WAN.

The wireless interface 212 includes an interactive communication circuit including at least one of elements such as a communication module, a communication chip, etc. corresponding to various kinds of wireless communication protocols. For example, the wireless interface 212 includes a Wi-Fi communication chip for wireless communication with the AP based on Wi-Fi; a communication chip for wireless communication based on Bluetooth, Zigbee, Z-Wave, WirelessHD, wireless gigabits (WiGig), near field communication (NFC), etc.; an infrared (IR) module for IR communication; a mobile communication chip for mobile communication with a mobile device; etc.

The electronic apparatus 200 may include a user input unit 220. The user input unit 220 includes a circuit related to various input interfaces to be controlled by a user to thereby receive a user input. The user input unit 220 may be variously configured according to the kinds of electronic apparatus 200, and may for example include a mechanical or electronic button, a touch pad, a sensor, a camera, and a touch screen of the electronic apparatus 200, a remote controller separated from the main body of the electronic apparatus 200, etc.

The electronic apparatus 200 may include a storage unit 230. The storage unit 230 is configured to store digitalized data. The storage unit 230 includes a nonvolatile storage in which data is retained regardless of whether power is supplied or not, and a volatile memory in which data loaded to be processed by a processor 240 is retained only when power is supplied. The storage includes a flash memory, a hard disc drive (HDD), a solid-state drive (SSD), a read only memory (ROM), etc., and the memory includes a buffer, a random-access memory (RAM), etc.

The electronic apparatus 200 may include the processor 240. The processor 240 includes one or more hardware processors achieved by a central processing unit (CPU), a chipset, a buffer, a circuit, etc. which are mounted on a printed circuit board (PCB). Alternatively, the processor 240 may be designed as a system on chip (SoC). The processor 240 includes modules corresponding to various processes, such as a multiplexer, a video encoder, an audio encoder, etc. Here, some or all of such modules may be achieved by the SoC.

The processor 240 obtains image content data received from the outside through the interface 210 or stored in the storage unit 230. The processor 240 is configured to encode data to meet the target bit rate, and transmit the encoded data to the external apparatus 205 through the interface 210. Therefore, the external apparatus 205 decodes the encoded data received from the electronic apparatus 200, and displays an image based on the decoded data.

However, the amount of image information is not uniform throughout a plurality of image frames included in the image content data, and therefore the processor 240 according to this embodiment encodes the image content data to meet the target bit rate while enhancing image quality by the following method.

Figure 3:
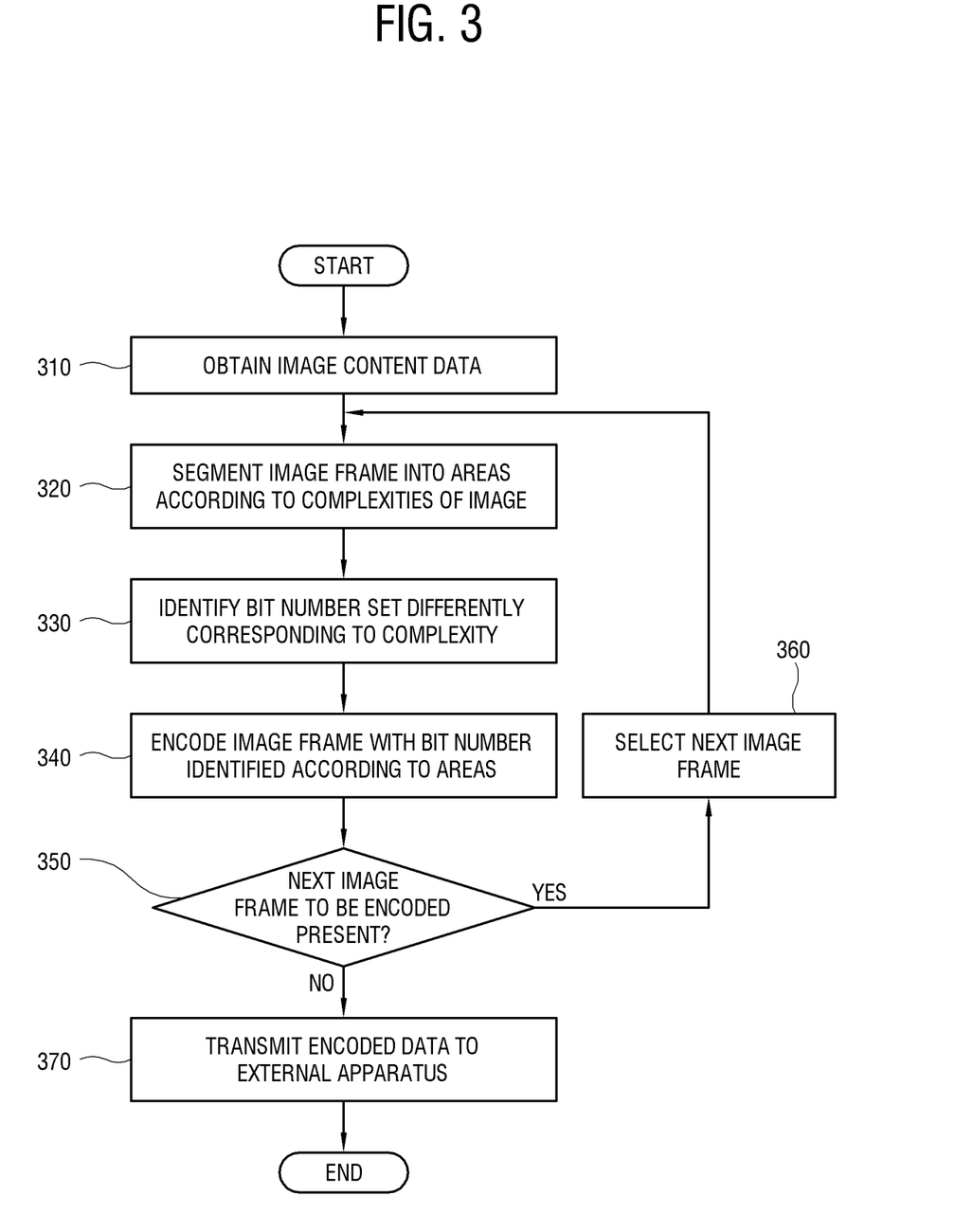
FIG. 3 is a flowchart showing a control method of an electronic apparatus.

FIG. 3 is a flowchart showing a control method of an electronic apparatus.

As shown in FIG. 3, the following operations are performed by a processor of the electronic apparatus when image content data is encoded.

At operation 310 the electronic apparatus obtains the image content data. Here, the image content data may be obtained as unencoded raw data.

At operation 320 the electronic apparatus segments an image frame of the image content data into a plurality of areas according to complexities of an image.

At operation 330 the electronic apparatus identifies bit numbers differently set corresponding to the complexities.

At operation 340 the electronic apparatus encodes data of the image frame with the identified bit numbers according to the areas of the image frame. In other words, according to an embodiment, the same bit number is not assigned throughout the area of one image frame, but different bit numbers are respectively assigned to the areas segmented according to the complexities of the image frame.

At operation 350 the electronic apparatus identifies whether the next image frame to be encoded is present in a current period. Here, the current period refers to a period during which the electronic apparatus encodes data, accumulates the encoded data, and transmits the accumulated data to the external apparatus. For example, the electronic apparatus repeats a unit operation of encoding and transmitting data corresponding to a predetermined section of the whole reproduction section of the image content data, and the period refers to time in which a single unit operation is performed.

When the next image frame to be encoded is present in the current period, at operation 360 the electronic apparatus selects the next image frame and returns to the operation 320.

On the other hand, when the next image frame to be encoded is absent in the current period, at operation 370 the electronic apparatus transmits the encoded data to the external apparatus.

Thus, the electronic apparatus minimizes deterioration of image quality, which occurs due to encoding, even while encoding the image content data at the target bit rate.

Meanwhile, the processor of the electronic apparatus may perform at least a part of data analysis, data process and result information generation based on at least one of machine learning, neural network, deep learning algorithms as a rule-based or artificial intelligence (AI) algorithm in order to perform operations of encoding the data of the image content with the bit number set based on the complexity of the image according to the plurality of areas of each individual image frame as described above, and transmitting the encoded data to an external apparatus.

For example, the processor of the electronic apparatus may function as a learner and a recognizer. The learner may perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the storage unit of the electronic apparatus or from the outside. The learning data may be data used for learning the neural network, and the data subjected to the foregoing operations may be used as the learning data to teach the neural network.

Before teaching the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network which is set to perform the operations.

The learned neural network may include a plurality of neural networks (or layers). The nodes of the plurality of neural networks have weights, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to carry out the foregoing operations. The target data may be obtained from the storage unit of the electronic apparatus or from the outside. The target data may be data targeted to be recognized by the neural network. Before applying the target data to the learned neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

The foregoing operations of the electronic apparatus may be re-sorted as follows. The electronic apparatus performs an area segmenting operation of segmenting the image frame into the plurality of areas based on the complexities of the image, a bit-number assigning operation of assigning the bit numbers according to the plurality of segmented areas, a parameter identifying operation of identifying an encoding parameter corresponding to an assigned bit rate, and an encoding carrying-out operation of encoding the image frame based on the identified encoding parameter. In the foregoing flowchart, the operation 320 corresponds to the area segmenting operation, the operation 330 corresponds to the bit-number assigning operation, and the operation 340 corresponds to the parameter identifying operation and the encoding carrying-out operation.

Below, it will be described that the electronic apparatus performs the bit-number assigning operation.

Figure 4:
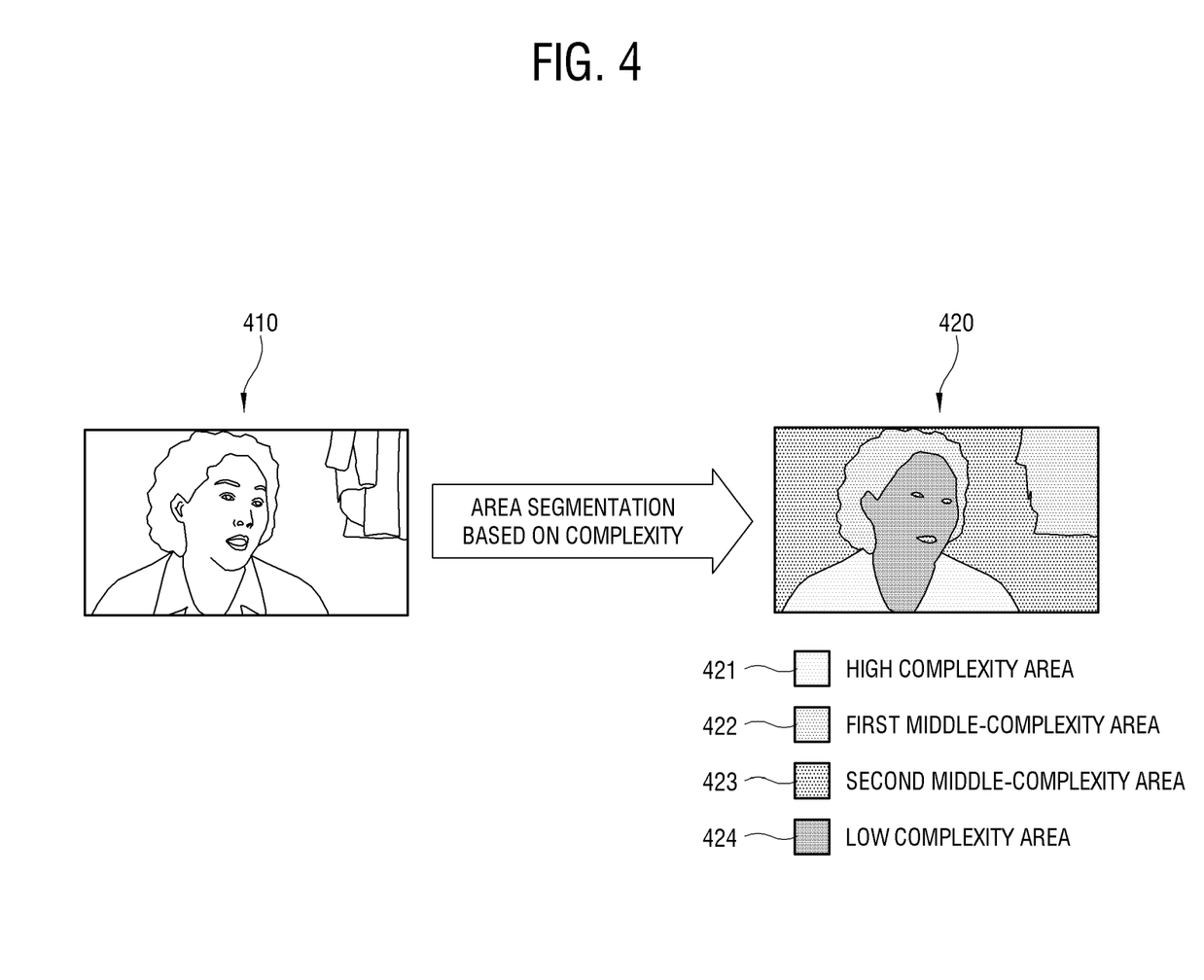
FIG. 4 illustrates a plurality of areas into which an electronic apparatus segments an image frame based on complexity.

FIG. 4 illustrates the plurality of areas into which the electronic apparatus segments the image frame based on the complexity.

As shown in FIG. 4, the electronic apparatus obtains a certain image frame 410 to be processed from image content data, and recognizes a plurality of areas 421, 422, 423 and 424 segmented from the whole area of the obtained image frame 410 based on complexities of an image. It does not mean that an image frame 420 with segmented areas is necessarily generated when the electronic apparatus actually operates, but the image frame 420 with the segmented areas is illustrated for convenience to just describe a principle that the electronic apparatus processes the image frame 410.

In this embodiment, the whole area of the image frame 410 is segmented into four areas 421, 422, 423 and 424 according to the complexities. The image frame 420 may be segmented into a high complexity area 421, a first middle-complexity area 422, a second middle-complexity area 423, and a low complexity area 424 in descending order of complexity. The number of areas 421, 422, 423 and 424 segmented according to the complexities is not limited to four, and may be varied depending on design methods.

The complexity in a certain area 421, 422, 423 or 424 of the image frame 420 is proportional to the amount of image information included in the corresponding area 421, 422, 423 or 424 or distribution of pixel values that the pixels in the corresponding area 421, 422, 423 or 424 have. High complexity in a certain area 421, 422, 423 or 424 indicates a large amount of image information included in the corresponding area 421, 422, 423 or 424. On the other hand, low complexity in a certain area 421, 422, 423 or 424 indicates a small amount of image information included in the corresponding area 421, 422, 423 or 424.

Like this, when the image frame 420 is segmented into the plurality of areas 421, 422, 423 and 424 according to the complexities, the electronic apparatus identifies a bit number corresponding to each complexity. The electronic apparatus assigns a plurality of identified bit numbers to the respective areas 421, 422, 423 and 424. The assignment of the bit number is achieved by a unit block, i.e. a minimum unit corresponding to an image format for image encoding. The unit block may be different according to the image formats. For example, the unit block is called a macroblock in a case of H.264 format, and called a coding unit in a case of HEVC format.

One image frame 410 is assigned with the target bit rate. The electronic apparatus assigns a relatively high bit number to an area having relatively high complexity among the plurality of areas 421, 422, 423 and 424, and assigns a relatively low bit number to an area having relatively low complexity. In other words, the bit number is differently assigned based on the complexity within a limited range of the target bit rate, so that the electronic apparatus can minimize deterioration of image quality even while easily encoding the image frame 410 at the target bit rate.

For example, the electronic apparatus may assign the bit numbers to the areas 421, 422, 423 and 424 by the following expression.

$$B\_frame = (W\_h * N\_h + W\_1 * N\_1 + W\_2 * N\_2 + \ldots + 1 * N\_f) * B$$

In the foregoing embodiment, B_frame is a bit number, previously assigned to the image frame 410, in other words, a target bit rate. B is a bit number assigned per unit block. "*" is a multiplication sign.

N_h, N_1, N_2, . . . , N_f are the numbers of unit blocks that belong to the areas 421, 422, 423 and 424 segmented according to the complexities, in which N_h>N_1>N_2> . . . >N_f with respect to the complexity. In this embodiment, N_h is the number of unit blocks that belong to a high complexity area 421, N_1 is the number of unit blocks that belong to a first middle-complexity area 422, N_2 is the number of unit blocks that belong to a second middle-complexity area 423, and N_f is the number of unit blocks that belong to a low complexity area 424.

W_h, W_1, and W_2 are weighted values respectively given to the areas 421, 422, 423 and 424 segmented according to the complexities. These values are previously defined values which satisfy 1<= ... <=W_2<=W_1<=W_h. In this embodiment, W_h is the weighted value assigned to the high complexity area 421, W_1 is the weighted value assigned to the first middle-complexity area 422, and W_2 is the weighted value assigned to the second middle-complexity area 423. When the weighted values are set like this, the area having higher complexity requires a higher bit number. Therefore, this embodiment enhances quality of encoded data within a limited bit rate, as compared with the quality of when the same bit number is assigned to all the areas.

Below, it will be described that the electronic apparatus performs the parameter identifying operation.

Usually, the encoding parameter is used in an encoding process. Adjustment in the encoding parameter causes change in the quality and amount of encoded data. The encoding parameter may for example include a quantization parameter (QP).

The physical meaning of the quantization refers to conversion into discontinuous and discrete physical quantity, and the communicational meaning of the quantization refers to operation of changing a sampling amplitude of an analog signal into a specific discrete value. Because the encoding operation essentially corresponds to lossy compression, the quantization in the encoding means level reduction of pixel values when the lossy compression is taken into account. For example, when pixel values of raw data are segmented into a total of 256 levels from 0 to 255, it may be assumed that original 256 levels are reduced into 128 levels by the encoding. In this case, the pixel values may be segmented like not 0, 1, 2, ..., 254, 255 but 1, 3, 5, ..., 253, 255. The pixel values only need to be segmented into not 256 levels but 128 levels, and therefore the encoded data is obviously decreased in the amount of image information as compared with the raw data. Like this, a method of readjusting the representative value of the original data to decrease the data at the encoding is regarded as the quantization.

High reflection of a quantization parameter to the encoding means much readjustment of the representative value, and therefore there is a big loss to the image quality of the encoded data and there is a large decrease in the encoded data. On the other hand, low reflection of the quantization parameter to the encoding means little adjustment of the representative value, and therefore there is a small decrease in the encoded data and there is a small loss to the image quality of the encoded data.

In the parameter identifying operation according to this embodiment, the electronic apparatus calculates the encoding parameter based on the bit numbers assigned to the areas 421, 422, 423 and 424, and performs encoding with regard to the areas 421, 422, 423 and 424 based on the calculated encoding parameter. The encoding parameters according to the areas 421, 422, 423 and 424 satisfy the following expression.

$$QP\_h = C\_h / R\_h$$

$$QP\_1 = C\_1 / R\_1$$

$$QP\_2 = C\_2 / R\_2$$

-continued

...

$$QP\_f = C\_f / R\_f$$

In the foregoing expression, QP_h, QP_1, QP_2, ..., QP_h are the quantization parameters corresponding to the areas 421, 422, 423 and 424 based on complexities. In terms of the complexity, QP_h>QP_1>QP_2> ... >QP f. In this embodiment, QP_h is the quantization parameter for the high complexity area 421, QP_1 is the quantization parameter for the first middle-complexity area 422, QP 2 is the quantization parameter for the second middle-complexity area 423, and QP f is the quantization parameter for the low complexity area 424.

C_h, C_1, C_2, ..., C_f are model constants previously defined according to the areas 421, 422, 423 and 424. In this embodiment, C_h is the model constant for the high complexity area 421, C_1 is the model constant for the first middle-complexity area 422, C_2 is the model constant for the second middle-complexity area 423, and C_f is the model constant for the low complexity area 424. "/" is a division sign.

R_h, R_1, R_2, ..., R_f are the bit numbers assigned to the areas 421, 422, 423 and 424. In this embodiment, R_h is the bit number assigned to the high complexity area 421, R_1 is the bit number assigned to the first middle-complexity area 422, R_2 is the bit number assigned to the second middle-complexity area 423, and R_f is the bit number assigned to the low complexity area 424.

Because the quantization parameter is in inverse proportion to the bit rate, a lower quantization parameter is applied to an area having a higher complexity, and a higher quantization parameter is applied to an area having a lower complexity. In other words, the amount of information included in an area with a higher complexity is so large that the image quality is severely deteriorated by the lossy compression at the encoding. Therefore, to preserve the amount of information at a higher level, lower quantization is reflected to an area with a higher complexity. On the other hand, the amount of information included in an area with a lower complexity is so small that the image quality is not relatively much deteriorated by the lossy compression at the encoding. Therefore, to enhance compressibility of data, higher quantization is reflected to an area with a lower complexity.

Like this, the electronic apparatus applies different quantization parameters to the areas 421, 422, 423 and 424 based on the complexities, and thus performs the encoding to meet the target bit rate while minimizing a loss of image quality. The quantization parameter may be calculated in units of the areas 421, 422, 423 and 424, or may be calculated in units of unit blocks when more detailed bit rate control is needed.

Meanwhile, the area segmenting operation may be designed to employ various methods. For example, an AI modeling technique such as a DNN-based segmentation technique, or a DCT frequency component analysis technique, etc. may be applied to the area segmenting operation. Embodiments to which such techniques area applied will be described later.

Below, a method by which an electronic apparatus segments an image frame into a plurality of areas according to complexities based on the AI modeling technique will be described.

Figure 5:
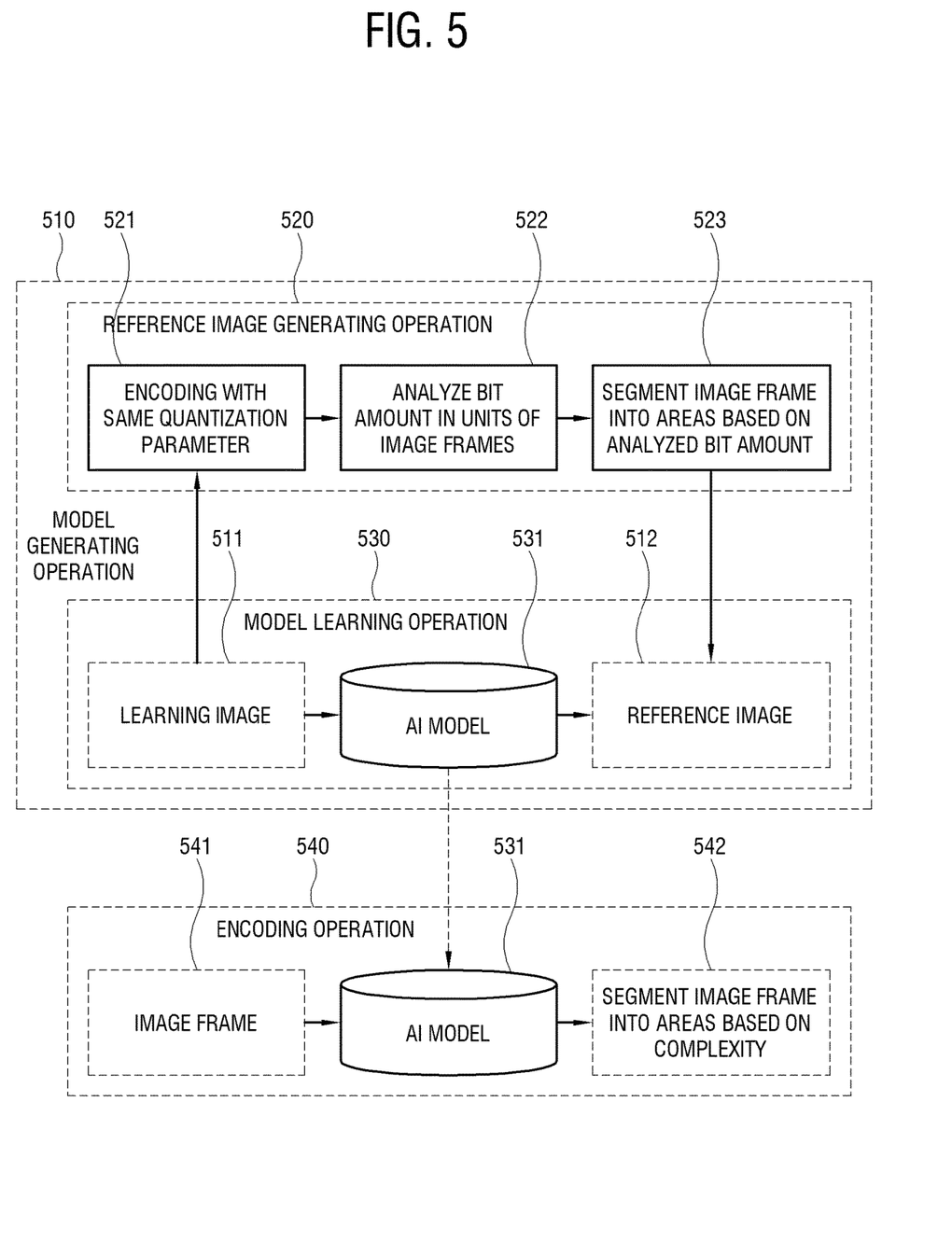
FIG. 5 shows a principle on which an electronic apparatus segments an image frame into a plurality of areas based on an artificial intelligence (AI) modeling technique.

FIG. 5 shows a principle on which an electronic apparatus segments an image frame into a plurality of areas based on the AI modeling technique.

As shown in FIG. 5, the method of segmenting a predetermined image frame into a plurality of areas according to complexities of an image based on the AI modeling technique includes a model generating operation 510 of generating an AI model 531, and an encoding operation 540 of segmenting an image frame into a plurality of areas based on the generated AI model 531. The electronic apparatus may perform both the model generating operation 510 and the encoding operation 540. Alternatively, the electronic apparatus may perform only the encoding operation 540, and another apparatus such as a server, etc. may perform the model generating operation 510 to thereby provide the AI model 531 to the electronic apparatus. The electronic apparatus may be configured to store the AI model 531, or may be configured to refer to the AI model 531 stored in another apparatus when performing the encoding.

The model generating operation 510 includes a reference image generating operation 520 of obtaining reference images 512 by segmenting a learning image 511 according to areas based on complexities, and a model learning operation 530 of teaching the AI model 531 with various learning images 511 based on the reference images 512.

In the reference image generating operation 520, the electronic apparatus encodes a plurality of learning images 511 with the same quantization parameter (521). When many learning images 511 are encoded with the same quantization parameter as above, the electronic apparatus compares bits generated in units of image frames, thereby comparing relative complexities in the image.

The electronic apparatus analyzes a bit amount in units of image frames (522). It will be assumed that a bit number generated by encoding a specific image frame with a previously defined quantization parameter is K[bits], and the number of unit blocks such as the macroblock or the coding unit included in the corresponding image frame is L. In this case, an average bit number of the unit blocks in the corresponding image frame is K/L[bits/block]. Such a calculated average bit number per unit block is set as a reference value.

The electronic apparatus segments an image frame into a plurality of areas based on the analyzed bit amount (523). The electronic apparatus compares the bit number, which is generated as encoded in units of actual unit blocks of the image frame, with the reference value, thereby identifying whether the unit block is an area that needs a higher bit number than the reference value. In other words, the electronic apparatus identifies an area, which needs a higher bit number at the encoding, as an area with a higher complexity, and identifies an area, which needs a lower bit number at the encoding, as an area with a lower complexity.

For example, it will be assumed that the areas corresponding to the complexities are segmented into four stages, i.e. the high complexity area, the first middle-complexity area, the second middle-complexity area, and the low complexity area in order of the complexity. The electronic apparatus may segment the image frame into a plurality of areas based on the complexities of the image as follows.

$B\_block > M\_1*K/L$; high complexity area $M\_1*K/L >= B\_block > M\_2*K/L$; first middle-complexity area $M\_2*K/L >= B\_block > M\_3*K/L$; second middle-complexity area $M\_3*K/L >= B\_block$; low complexity area B_block is an encoding bit number actually generated in each unit block when the image frame is encoded. M_1, M_2, and M_3 are previously defined constants, and satisfy $M\_1 > M\_2 > M\_3$. "*" is a multiplication sign.

For example, when it is defined that M_1=1.5, M_2=1.0, and M_3=0.5, and an actual bit number of the unit block is 1.5 times higher than the average bit number per unit block in the image frame, it is regarded that the corresponding unit block belongs to the high complexity area. When the actual bit number of the unit block is not 1.5 times higher than but as high as the average bit number per unit block in the image frame, it is regarded that the corresponding unit block belongs to the first middle-complexity area. When the actual bit number of the unit block is not as high as but 0.5 times higher than the average bit number per unit block in the image frame, it is regarded that the corresponding unit block belongs to the second middle-complexity area. When the actual bit number of the unit block is not 0.5 times higher than the average bit number per unit block in the image frame, it is regarded that the corresponding unit block belongs to the low complexity area. This is merely an example given when the encoding complexity is segmented into four levels, and the constants may be varied depending on the stages of segmenting the complexities. Through such processes, all the learning images 511 are segmented based on the encoding complexities, i.e. the encoding bit numbers, thereby generating the reference image 512.

In other words, the electronic apparatus calculates the average bit number of the unit blocks according to the image frames of the learning images 511, and segments the corresponding image frame into the plurality of areas according to the complexities based on the calculated average bit number regarded as the reference value, thereby generating the reference image 512.

According to a usual method, all the skilled people need to manually do tagging for marking object and background areas with regard to all the learning images 511, in order to generate the reference image 512 for the object-based AI model 531. On the other hand, in order to generate the reference image 512 for the encoding complexity-based AI model 531 according to an embodiment, as long as it is previously set how many stages the complexity of the image will be segmented into, the rest of the process is automatically carried out, and thus the cost of generating the reference image 512 is significantly reduced.

Next, in the model learning operation 530, the electronic apparatus uses the learning image 511 and the reference image 512 to make the AI model 531 learn. A model learning process sets a model network structure such as ResNet, InceptionNet, and MobileNet like a conventional object-based segmentation model, and obtains a model weight through a Backpropagation process. For example, the electronic apparatus may repeat a process of adjusting parameters according to nodes in the AI model 531 so that a result of converting the learning image 511 by the AI model 531 can correspond to the reference image 512.

When the AI model 531 is established after the model generating operation 510 is finished as above, the electronic apparatus performs encoding based on the AI model 531 in the encoding operation 540. The electronic apparatus processes an image frame 541 of content image data through the AI model 531, thereby segmenting the corresponding image frame 541 into a plurality of areas based on complexities (542). The subsequent operations are the same as those described in the foregoing embodiment.

In this embodiment, the electronic apparatus uses the previously established AI model 531 to perform the encoding. However, the electronic apparatus or the server may be designed to update and then use the established AI model 531. For example, the electronic apparatus performs the encoding based on the AI model 531, and continuously performs an updating process of adjusting detailed parameters of the AI model 531 by using an encoding result as learning data. Like this, an actual encoding result is used as the learning data, and thus the amount of learning data increases, thereby establishing the AI model 531 more improved in performance.

Below, a method by which an electronic apparatus segments an image frame into a plurality of areas according to complexities based on an analysis technique for a DCT frequency component will be described.

Figure 6:
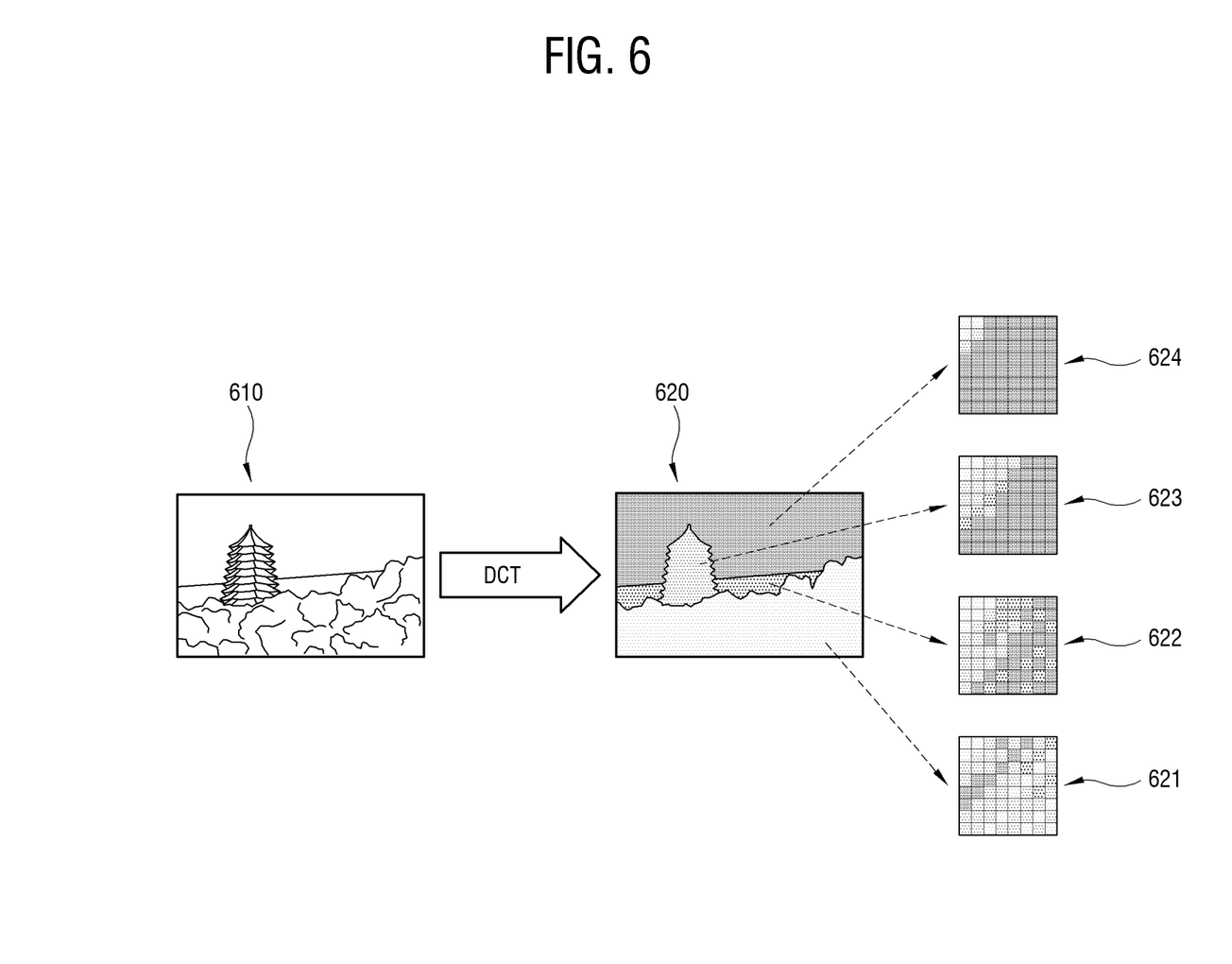
FIG. 6 shows a principle on which an electronic apparatus segments an image frame into a plurality of areas based on an analysis technique for a discrete cosine transform (DCT) frequency component.

FIG. 6 shows a principle on which an electronic apparatus segments an image frame into a plurality of areas based on an analysis technique for a DCT frequency component.

As shown in FIG. 6, the electronic apparatus may segment an image frame 610 into a plurality of areas based on the analysis technique for the DCT frequency component.

The DCT refers to an orthogonal transform encoding method using a discrete cosine function as a coefficient to transform an image signal of a time domain into that of a frequency domain. In the DCT, a previously defined DCT block is employed, and each pixel of the image frame 610 is block-by-block calculated into a DCT block, thereby drawing an image frame 620 segmented based on a frequency component.

The DCT block includes sixty-four subblocks (8*8=64) individually having a coefficient or reference value. In the DCT block, upper left areas corresponds to a low frequency component, lower right areas correspond to a high frequency component, and middle areas correspond to a middle frequency component. The electronic apparatus obtains an average energy value of pixel-unit-based frequency components calculated by applying the DCT in units of pixels of the image frame 610, and compares the obtained average energy value and an energy level of the frequency component of each pixel.

For example, when the levels of the frequency components corresponding to the areas are compared in the result 620 from applying the DCT process to the image frame 610, the areas may be segmented into flat areas, low frequency areas, middle frequency areas, and high frequency areas. The electronic apparatus compares the average energy levels of the low, middle and high frequency components with each other with respect to the pixels of the image frame 620 subjected to the DCT process. When the high frequency components have the highest energy level as a DCT distribution result 621 of predetermined pixels in the image frame 620 subjected to the DCT Process, the corresponding pixels are identified as the high frequency area. When the middle frequency components have the highest energy level as a DCT distribution result 622 of predetermined pixels in the image frame 620 subjected to the DCT Process, the corresponding pixels are identified as the middle frequency area. When the low frequency components have the highest energy level as a DCT distribution result 623 of predetermined pixels in the image frame 620 subjected to the DCT Process, the corresponding pixels are identified as the low frequency area. When all the energy levels of the three frequency components are lower a predetermined threshold as a DCT distribution result 624 of predetermined pixels in the image frame 620 subjected to the DCT Process, the corresponding pixels are identified as the flat area. Specifically, sum of energy of DCT coefficients according to the areas previously defined in the DCT blocks are compared with the threshold, thereby segmenting the corresponding pixels.

$E[(C\_h)^2] > T\_h$; high frequency area $T\_h >= E[(C\_m)^2] > T\_m$; middle frequency area $T\_m >= E[(C\_l)^2] > T\_l$; low frequency area The rest of the areas except the foregoing three areas is the flat area.

In the above expression, $E[\ ]$ is an average function. $(C\_h)^2$, $(C\_m)^2$, and $(C\_l)^2$ are energy of DCT coefficients corresponding to the frequency areas in the DCT block. $(C\_h)^2$ is the energy of the DCT coefficients corresponding to the high frequency areas in the DCT block, $(C\_m)^2$ is the energy of the DCT coefficients corresponding to the middle frequency areas in the DCT block, and $(C\_l)^2$ is the energy of the DCT coefficients corresponding to the low frequency areas in the DCT block. $T\_h$, $T\_m$, and $T\_l$ are previously defined thresholds, and satisfy $T\_h > T\_m > T\_l$. The four areas defined herein (i.e. the flat area, the low frequency area, the middle frequency area, and the high frequency area) and the numbers of the DCD coefficients involved according to the area may be various defined according to the kind of encoding codec, and the characteristics of the input image.

The electronic apparatus identifies an area, of which the energy of the frequency component is high, as an area having a high complexity, and identifies an area, of which the energy of the frequency component is low, as an area having a low complexity. In other words, the electronic apparatus identifies that the image complexity is high in order of the high frequency area, the middle frequency area, the low frequency area, and the flat area. Based on such identification results, the electronic apparatus assigns the corresponding bit numbers to the areas. The subsequent operations are the same as those described in the foregoing embodiment.

In brief, the complexity of the image may be identified based on the frequency characteristics of the image within the areas of the image frame 620. The areas different in the frequency characteristics are identified based on the DCT block in which the plurality of coefficients are distributed according to the frequency component. When the plurality of areas different in the frequency characteristics are identified as above, the electronic apparatus assigns the bit numbers corresponding to the frequency characteristics of the areas (i.e. the energy of the frequency component).

The operations of the apparatus described in the foregoing embodiments may be performed by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program instruction that can be implemented in various computers, and recorded in a computer readable medium. Such a computer readable medium may include a program instruction, a data file, a data structure or the like, or combination thereof. For example, the computer readable medium may be stored in a nonvolatile storage unit such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage unit medium, for example, a compact disk (CD), a digital versatile disk (DVD), a magnetic disk, a magnetic tape or the like. It will be appreciated that a memory, which can be included in a mobile terminal, is an example of the machine-readable storage unit medium suitable for storing a program having instructions for realizing the embodiments. The program instruction recorded in this storage unit medium may be specially designed and configured according to the embodiments, or may be publicly known and available to those skilled in the art of computer software. Further, the computer program instruction may be implemented by a computer program product.

Although a few embodiments have been shown and described, it will be appreciated by those skilled in the art that changes may be made in these embodiments without departing from the principles and spirit of the invention, the scope of which is defined in the appended claims and their equivalents.

What is claimed is:

1. An electronic apparatus comprising:
an interface configured to communicate with an external apparatus; and
a processor configured to:
segment a frame of an image content into a plurality of areas based on a model learned in association with a complexity of the image content,
encode data of each segmented area of the plurality of areas of the frame with a bit number, respectively, based on the complexity of the image in an area among the plurality of areas of the frame of the image content, wherein the complexity of the image is based on a frequency characteristic of the image in the area,
identify areas among the plurality of areas different in the frequency characteristics of the image from each other in the frame,
assign a bit number corresponding to the frequency characteristics in correspondence with each individual identified area, and
control the interface to transmit the encoded data to the external apparatus.

2. The electronic apparatus according to claim 1, wherein the area is a first area and the processor is configured to:
encode the first area of the frame among the plurality of areas of the frame of the image content with the bit number which is a first bit number, and
encode a second area of the frame among the plurality of areas of the frame of the image content with a second bit number greater than the first bit number, the second area having a higher complexity than the complexity of the first area of the frame.

3. The electronic apparatus according to claim 1, wherein the processor is configured to identify the plurality of areas different in the frequency characteristics of the image from each other in the frame, based on a block in which a plurality of reference values are distributed according to a frequency component.

4. The electronic apparatus according to claim 1, wherein the processor is configured to assign the bit number based on an energy level of the frequency component to each individual identified area.

5. An electronic apparatus comprising:
an interface configured to communicate with an external apparatus; and
a processor configured to:
segment a frame of an image content into a plurality of areas based on a model learned in association with a complexity of the image content,
encode data of each segmented area of the plurality of areas of the frame with a bit number, respectively, based on the complexity of the image in an area among the plurality of areas of the frame of the image content,
set the bit number based on the model learned in association with the complexity of the image, and
control the interface to transmit the encoded data to the external apparatus.

6. The electronic apparatus according to claim 5, wherein the model learned is based on a reference image obtained by encoding a learning image with a previously defined bit number.

7. The electronic apparatus according to claim 5, wherein the processor is configured to:
identify a target bit rate; and
set the bit number to be used to encode the data of the image content based on the identified target bit rate.

8. The electronic apparatus according to claim 5, wherein the processor is configured to draw a quantization parameter that is in inverse proportion to the bit number set for the area, and encode data of the area based on the drawn quantization parameter.

9. A method of controlling an electronic apparatus, comprising:
obtaining image content;
segmenting a frame of the image content into a plurality of areas based on a model learned in association with a complexity of the image content, encoding data of the each segmented area of the plurality of areas of the frame with a bit number, respectively, based on the complexity of the image in an area among the plurality of areas of the frame of the image content, wherein the complexity of the image is based on a frequency characteristic of the image in the area, wherein the encoding comprises:
- identifying areas among the plurality of areas different in the frequency characteristics of the image from each other in the frame, and
- assigning a bit number corresponding to the frequency characteristics in correspondence with each individual identified area; and transmitting the encoded data to the external apparatus.

10. The method according to claim 9, wherein the area is a first area and the method further comprises:
- encoding the first area of the frame among the plurality of areas of the frame of the image content with the bit number which is a first bit number, and
- encoding a second area of the frame among the plurality of areas of the frame of the image content with a second bit number greater than the first bit number, the second area having a higher complexity than the complexity of the first area of the frame.

11. The method according to claim 9, further comprising identifying the plurality of areas different in the frequency characteristics of the image from each other in the frame, based on a block in which a plurality of reference values are distributed according to a frequency component.

12. The method according to claim 9, further comprising assigning the bit number based on an energy level of the frequency component to each individual identified area.

13. A method of controlling an electronic apparatus, comprising:
- obtaining image content;
- segmenting a frame of the image content into a plurality of areas based on a model learned in association with a complexity of the image content;
- encoding data of the each segmented area of the plurality of areas of the frame with a bit number, respectively, based on the complexity of the image in an area among the plurality of areas of the frame of the image content, wherein
  - the encoding comprises setting the bit number based on the model learned in association with the complexity of the image; and
- transmitting the encoded data to the external.

14. The method according to claim 13, wherein the model learned is based on a reference image obtained by encoding a learning image with a previously defined bit number.

15. The method according to claim 13, further comprising:
- identifying a target bit rate; and
- setting the bit number to be used to encode the data of the image content based on the identified target bit rate.

16. The method according to claim 13, further comprising: drawing a quantization parameter that is in inverse proportion to the bit number set for the area, and encoding data of the area based on the drawn quantization parameter.

* * * * *